(12) United States Patent
Tsai et al.

(10) Patent No.: US 8,086,637 B1
(45) Date of Patent: Dec. 27, 2011

(54) ACCESS CONTROL FOR BUSINESS PROCESS DATA

(75) Inventors: Kenwood Tsai, Palo Alto, CA (US);
Harish Rawat, San Jose, CA (US);
Xiaoting Tang, Pleasanton, CA (US);
Payam Shahidi, San Jose, CA (US)

(73) Assignee: EMC Corporation, Hopkinton, MA (US)

( * ) Notice: Subject to any disclaimer, the term of this patent is extended or adjusted under 35 U.S.C. 154(b) by 1032 days.

(21) Appl. No.: 11/644,340

(22) Filed: Dec. 22, 2006

(51) Int. Cl.
*G06F 17/30* (2006.01)
*G06F 7/00* (2006.01)

(52) U.S. Cl. ......... 707/785; 707/769; 707/944; 707/955

(58) Field of Classification Search .................. None
See application file for complete search history.

(56) References Cited

U.S. PATENT DOCUMENTS

| | | | |
|---|---|---|---|
| 5,765,153 A * | 6/1998 | Benantar et al. ..................... 1/1 |
| 6,292,798 B1 * | 9/2001 | Dockter et al. ..................... 1/1 |
| 6,463,535 B1 * | 10/2002 | Drews ........................... 713/176 |
| 6,625,603 B1 * | 9/2003 | Garg et al. ...................... 707/758 |
| 7,340,406 B1 * | 3/2008 | Tribble ........................ 705/7.36 |
| 2003/0195789 A1 * | 10/2003 | Yen .................................. 705/9 |
| 2005/0004978 A1 * | 1/2005 | Reed et al. ..................... 709/203 |
| 2005/0039033 A1 * | 2/2005 | Meyers et al. ................. 713/193 |
| 2005/0044396 A1 * | 2/2005 | Vogel et al. .................... 713/200 |
| 2005/0114661 A1 * | 5/2005 | Cheng et al. ................... 713/167 |
| 2006/0026558 A1 * | 2/2006 | Beringer et al. ............... 717/106 |
| 2006/0174334 A1 * | 8/2006 | Perlin et al. ...................... 726/9 |

* cited by examiner

*Primary Examiner* — Greta Robinson
*Assistant Examiner* — James J Wilcox
(74) *Attorney, Agent, or Firm* — Van Pelt, Yi & James LLP

(57) ABSTRACT

Controlling access to business process data is disclosed. An instance of a business process object configured to contain business process data is created. An access control list that is determined based at least in part on a business process with which the business process data is associated is associated with the business process object instance.

12 Claims, 7 Drawing Sheets

ACCESS CONTROL FOR BUSINESS PROCESS DATA

BACKGROUND OF THE INVENTION

Business Process Management (bpm) software allows businesses to automate their work flow. For example, the steps for requesting a vacation can be captured in a flow that runs on a business process computer system which takes a vacation request as input, calculates if the requested vacation time is available, routes it to the proper approving manager, and, once approved, notifies all relevant associated personnel and posts it on a group calendar. During the execution of the business process, a number of business objects may be created and stored in the computer system to store relevant business process data. In some cases, the different users that interact with the business process will control or have access to the entire process and all of the process's associated data. However, the data involved or associated with a given business processes may have different access requirements depending on the data's nature. For example, in a loan mortgage approval process, an appraiser should not be able to access all of the applicant's financial information despite being able to input the appraisal as part of the business process. It would be beneficial to have access to different business objects associated with a business process be able to be controlled individually for each business object.

BRIEF DESCRIPTION OF THE DRAWINGS

Various embodiments of the invention are disclosed in the following detailed description and the accompanying drawings.

DETAILED DESCRIPTION

Figure 1:
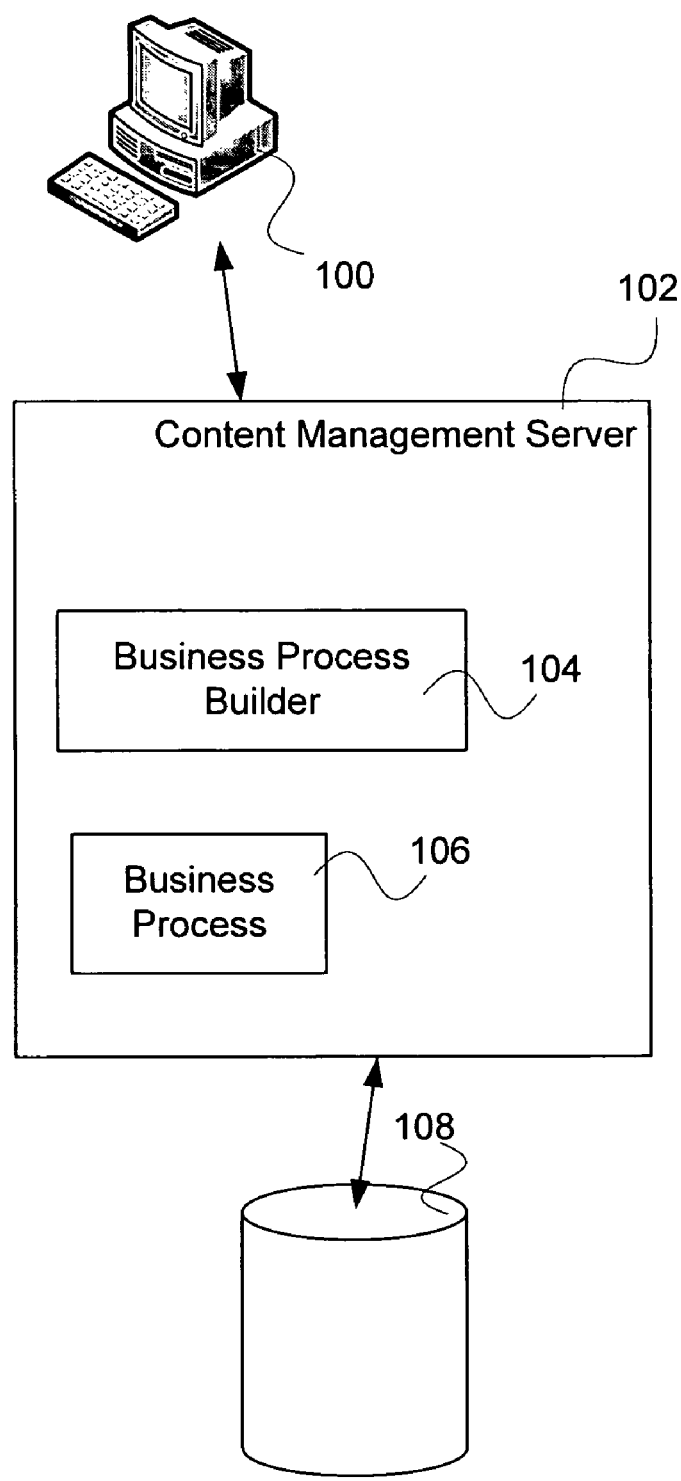
FIG. 1 is a block diagram illustrating an embodiment of a system for controlling access to business process data.

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Controlling access to business process data is disclosed. During the development of a business process, one or more business process objects that can hold business process data are specified. Each business process object is associated with a potentially different access control list (ACL). When an instance of the business process is created, e.g., upon submission of a vacation request by employee X for dates Y to Z, in the example described above, instances of the one or more business process objects are created and stored in a repository. For each such business process object instance, the corresponding access control list associated with that business process object at business process design time is associated with the business process object instance. Access to each instance of the one or more business process objects is controlled by the access control list that was associated with the business process object instance at the time the business process object instance was created. The access control list indicates a type of access that an application, a user, or a group of users is allowed.

Two different business processes can have associated with it the same type of business process object as another business process. However, each of the two different business processes can associate a potentially different access control list with said business process object, even though said business process object is of the same type for the two different business processes. For example, a vacation request business process may have associated with it an "employee" type of business object, and a purchase order request business process can have a business object of same type "employee" associated with it. In some embodiments, a different ACL may be associated, e.g., at business process design time, with the employee type object in the context of a vacation request than in the context of a purchase order request. For example, a purchasing department worker may be given "read" access to employee objects associated with a purchase order business process instance, but denied access to the same type of object created in the context of a vacation request business process instance. In some embodiments, business process objects associated with one or more business processes are stored in a repository comprising and/or associated with a content management system, and the repository and/or associated content management system manages the function of associating a business process object instance created by an instance of a business process an ACL associated with the business process object at the time the business process was defined (or some other time prior to instantiation of the current business process instance). In some embodiments, the repository and/or associated content management system controls access to the business process object instance, in accordance with the ACL.

FIG. 1 is a block diagram illustrating an embodiment of a system for controlling access to business process data. In the example shown, a user using computer 100 accesses content management system 102. Content management server 102 includes business process builder 104 which can be used by a developer to create business process 106. When developing business process 106, developer indicates access control associated with any business process object that is used by business process 106. Business process 106, when executed, creates an instance of business process object(s) that are stored in repository 108. In some embodiments, the instance may be a copy of an existing object stored in the repository 108, e.g., a copy of an existing employee object of employee X in the vacation request example given above. In some embodiments, the instance may be created based on an object class or type stored in and/or otherwise associated with repository 108. Repository 108 controls access to the stored instance of any business process object based on the associated access control as specified by the developer to be associated with the business process object.

Figure 2:
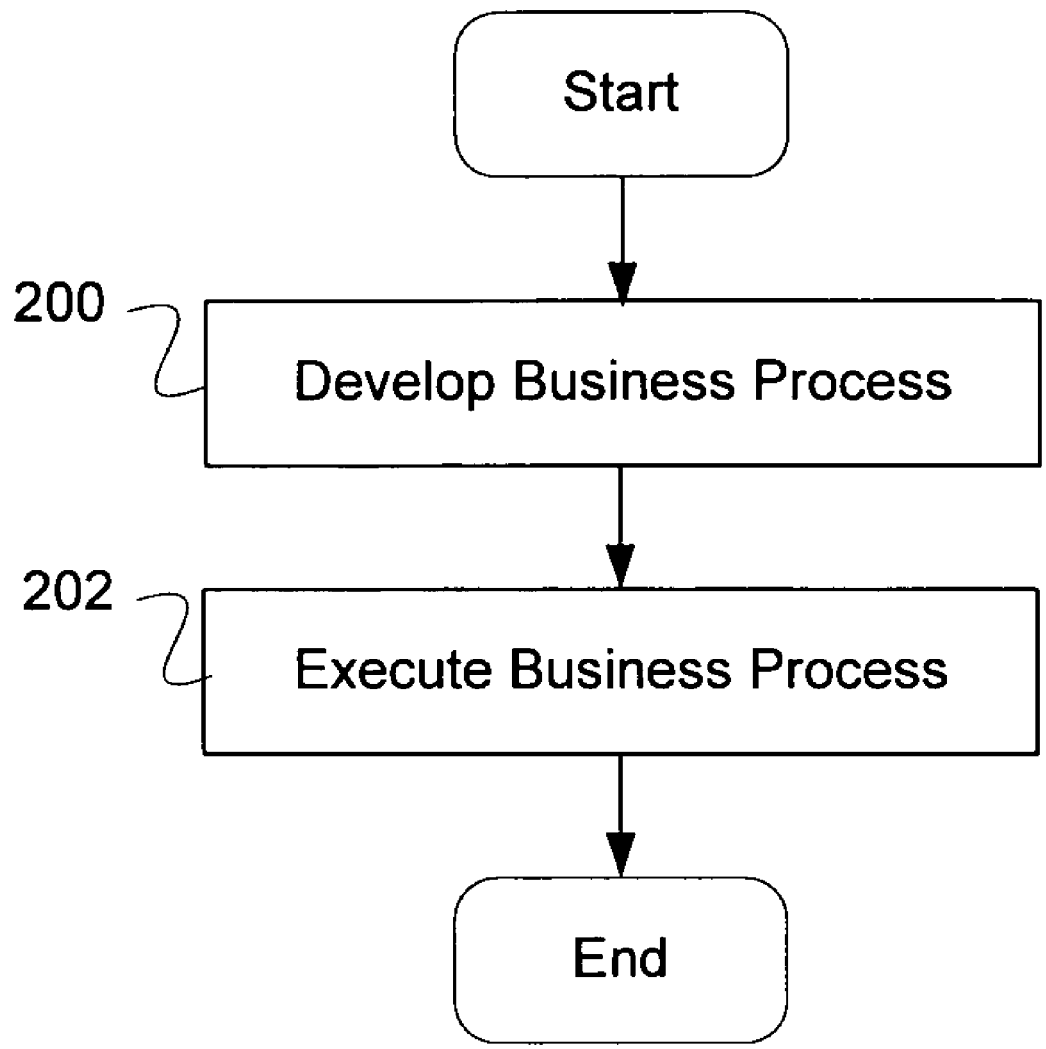
FIG. 2 is a flow diagram illustrating a process for creating and running a business process.

FIG. 2 is a flow diagram illustrating a process for creating and running a business process. In some embodiments, the process of FIG. 2 is executed in content management server 102. In the example shown, in 200 a business process is developed. A developer using an application running as part of a content management system develops a business process. A business process includes a defined number of steps that manipulate data that is stored in a business process object. The data may either by entered by end users interacting with the system manually or can be received from other applications. For example, a process to create a purchase order includes entering customer information, entering purchase order details of what is being purchased by the customer, and entering the employee information that is creating the purchase order. In this case, the process has a number of steps that require entering data that is stored as a customer information object, a purchase order object, and an employee information object. Or for example, a process to create a vacation request includes entering desired vacation information and entering the employee information that is requesting the vacation. In this second case, the process also has a number of steps that require entering data that is stored. The data being a desired vacation information object and an employee information object.

In 202, the business process is executed. An instance of the business process is created and run. The instance of the business process creates a set associated business process objects that hold data.

Figure 3:
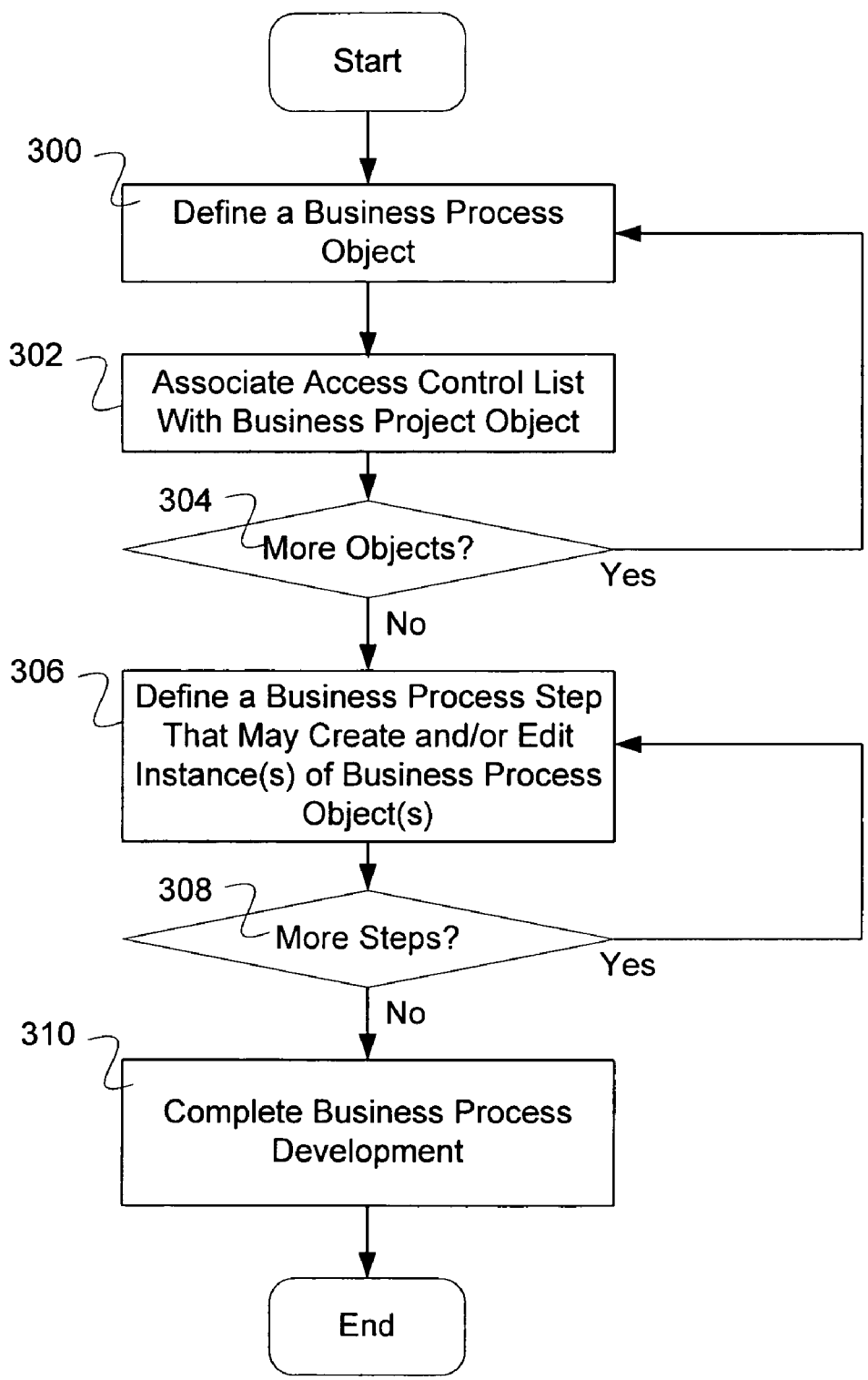
FIG. 3 is a flow diagram illustrating an embodiment of a process for developing a business process.

FIG. 3 is a flow diagram illustrating an embodiment of a process for developing a business process. In some embodiments, the process of FIG. 3 is used to implement 200 of FIG. 2. In the example shown, in 300 a business process object is defined. The business process object holds data for a business process where the steps of the business process may read, write, edit, or delete data associated with the business process object. In 302, an access control list is associated with the business process object. The access control list indicates a type of access that an application, a user, or a group will be allowed to have to the business process object. Access can be specified as a permission or restriction including one or more of the following: none, browse, read, relate (e.g., link to other objects), version, write, change location, change owner, change state, change permission, delete, execute, annotate, approve, or any other appropriate access to the business process object. The ACL can also specify a permission or a restriction for an application, a user, or a group of users. The ACL can also specify that the accessing party is required to be a specific application, a specific user, or a specific group of users. Similarly, access can also be restricted if the accessing party is a specific application, a specific user, or a specific group of users. In 304, it is determined if there are more objects. If there are, control passes to 300 where a next business process object is defined. If there are not, control passes to 306.

In 306, a business process step is defined that may edit one or more instances of one or more business process objects. For example, a new DSL Service Business process includes steps to: 1) submit DSL service form; 2) assign work order to DSL technician (manual step); 3) wait for 10 business days for any complaints; 4) charge credit card; and 5) end business process. The DSL service form step of the business process includes entering customer information into a customer business process object, credit card information into a credit card business process object, and order details into an order details business process object. Each of these objects has different access control lists associated with them (as indicated during the development process). For example, the customer business process object may be read and written by a customer service representative, but only read by an installation technician; the credit card business process object may be read and written by a customer service representative, but no access is available for an installation technician; and, the order details business process object may be read and written by a customer service representative, and also read and written by an installation technician. In 308, it is determined if there are more steps. If there are, then control passes to 306. If not, then in 310 the business process development is completed. Completion includes building a business process or saving the business process.

Figure 4:
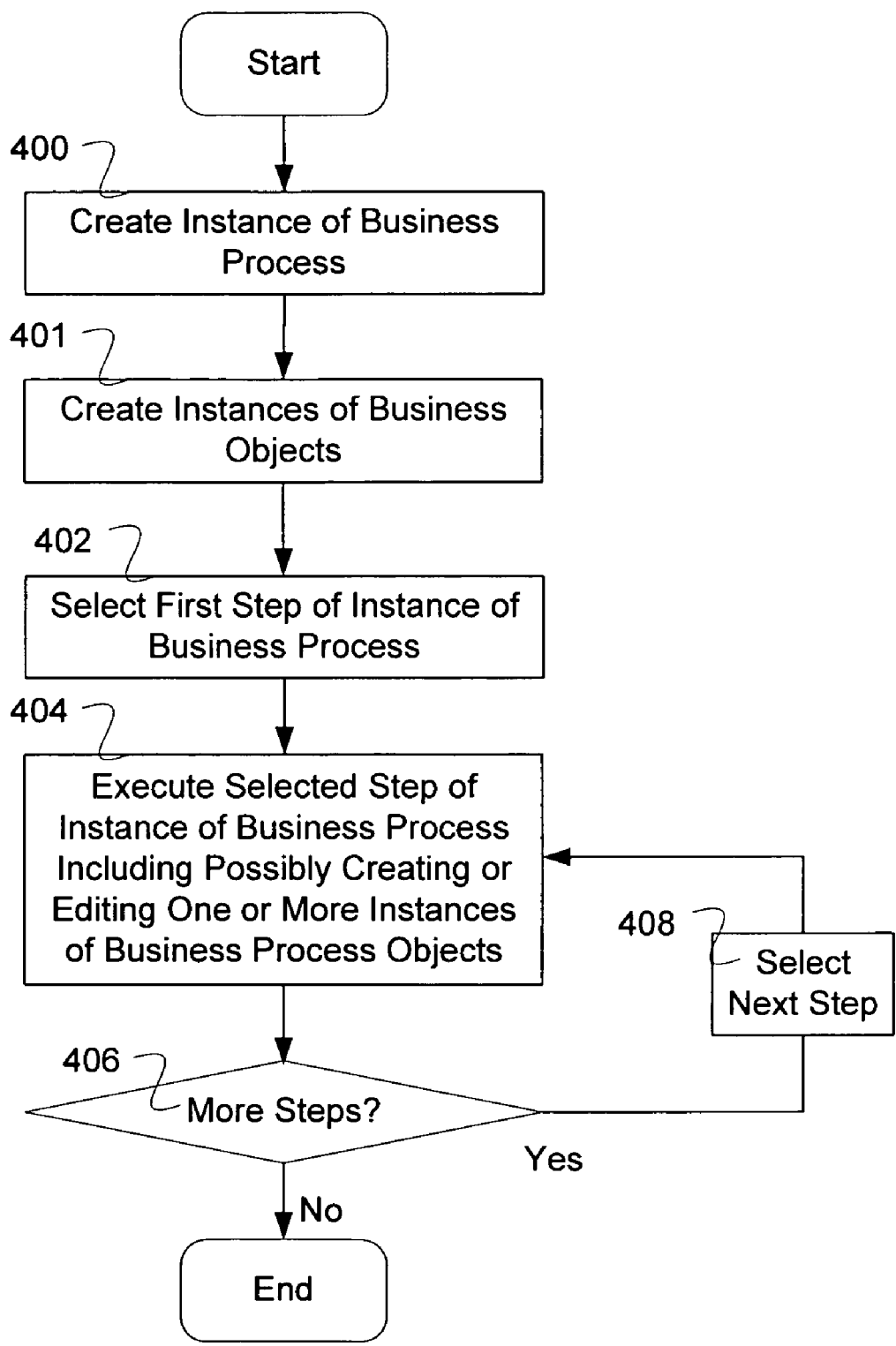
FIG. 4 is a flow diagram illustrating an embodiment of a process for executing a business process.

FIG. 4 is a flow diagram illustrating an embodiment of a process for executing a business process. In some embodiments, the process of FIG. 4 is used to implement 202 of FIG. 2. In the example shown, in 400 an instance of the business process is created. In 401 instances of business objects are created. In 402, the first step of the instance of the business process is selected. In 404, the selected step of the instance of the business process is executed including possibly editing one or more instances of business objects. In 406, it is determined if there are more steps. If so, in 408 a next step is selected and control passes to 404. If not, then the process ends.

Figure 5:
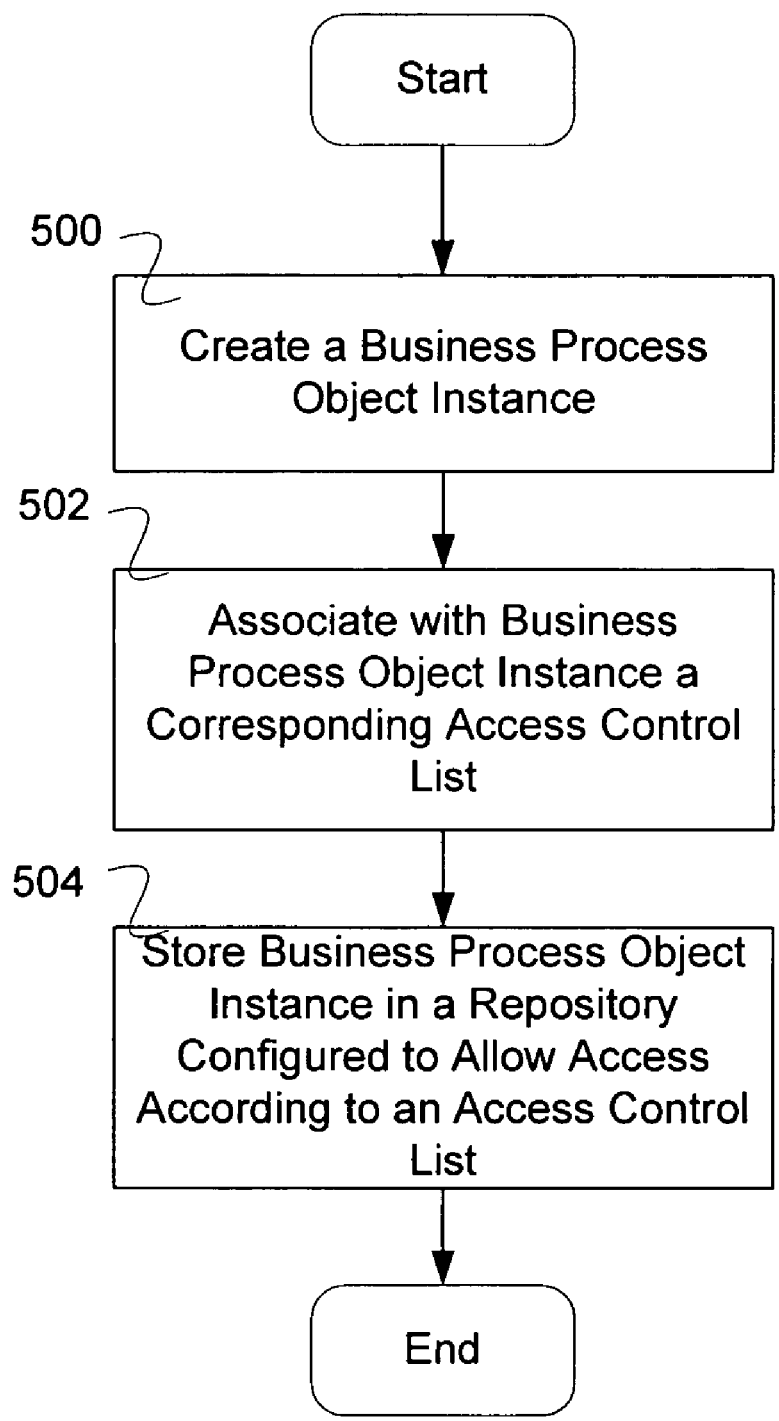
FIG. 5 is a flow diagram illustrating an embodiment of a process for creating and storing a business process object instance.

FIG. 5 is a flow diagram illustrating an embodiment of a process for creating and storing a business process object instance. In some embodiments, the process of FIG. 5 is used as part of 404 of FIG. 4. In the example shown, in 500 a business object instance is created. In 502, a corresponding access control list is associated with the business process object instance. In some embodiments, the ACL that is associated at 502 with the business process object instance comprises an ACL that was associated at business process design time, or some other time prior to instantiation at 500 of the business process object instance, with the business process object (i.e., the type or class of business object) in the context of the business process an instance of which created the business process object instance. In 504, the business process object instance is stored in a repository configured to allow access according to an access control list. When the business process object instance is accessed (or attempted to be accessed) by any application—for example, search, browsing, etc.—the repository allows or denies access based on the associated access control list.

Figure 6:
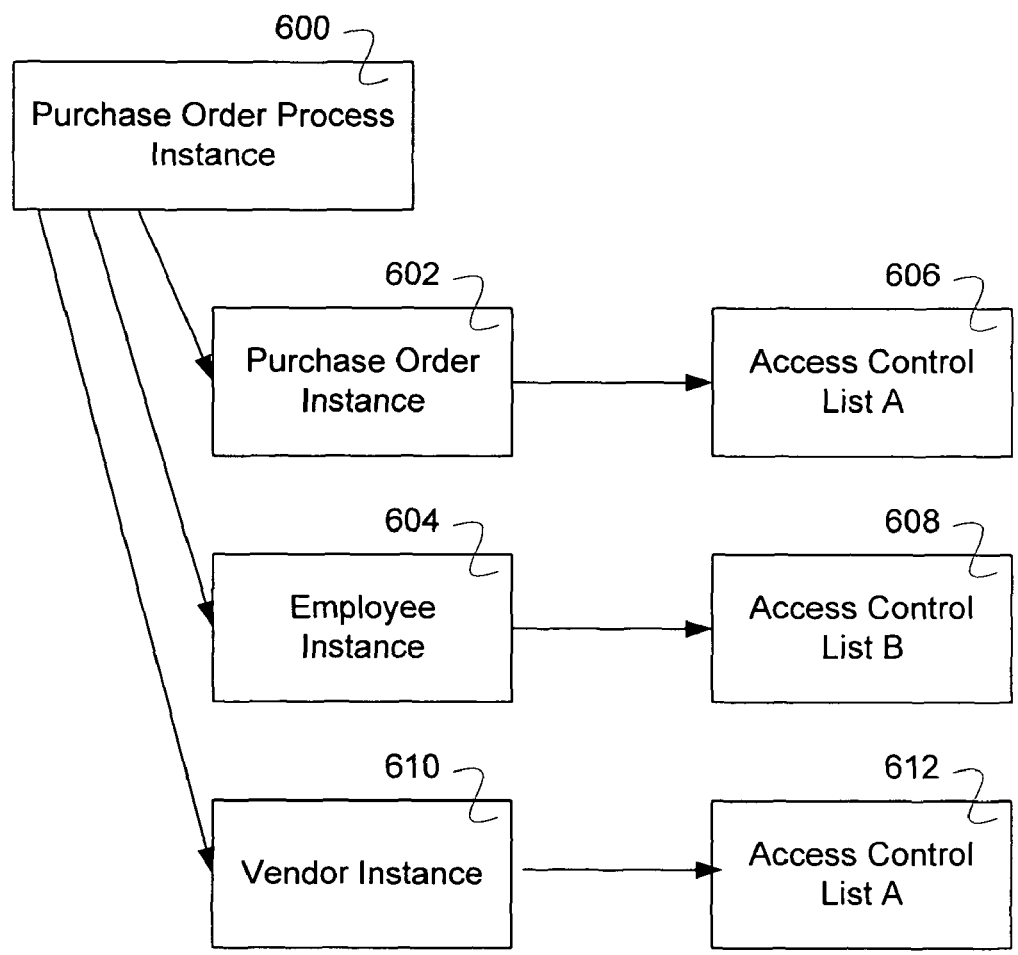
FIG. 6 is a block diagram illustrating an example of an embodiment of a business process instance and business process object instances.

FIG. 6 is a block diagram illustrating an example of an embodiment of a business process instance and business process object instances. In some embodiments, purchase order process instance 600 of FIG. 6 corresponds to a business process instance as created in 500 of FIG. 5, and purchase order instance 602 and access control list A 606 correspond to a business process object instance along with its corresponding access control list as referred to in 502 of FIG. 5. Similarly, employee instance 604 and customer instance 610 are instances of business process objects each with a corresponding access control list (608 and 612, respectively). In the example shown, purchase order process instance 600 is a business process instance that instantiates a purchase order process. The instance of the process creates associated business process objects (602, 604, and 610) and their associated access control lists (606, 608, and 612). Access control lists for the business process objects are selected based on the access appropriate for the data held in the instance of the business process object. For example, information regarding the purchase authorization level should be able to be edited by a human resource department; however, a requesting employee should not be able to change this field.

Purchase order instance 602 includes information regarding a purchase request—for example, the purchase request date, the requested item, the purchase order number, order date, receive date, paid date, etc. Associated access control list A 606 includes access information indicating read/write/edit access for requesting employee, an accounting department, an ordering department, and a shipping/receiving department so that they can each read, enter, and modify entries of the purchase order.

Employee instance 604 includes information regarding an employee that requested the purchase order—for example, employee name, employee identification number, purchase authority level, etc. Associated access control list B 608 includes access information indicating read access for the ordering and shipping/receiving department so the requestor can be contacted if there are questions regarding the order and read/write/edit/delete access for the human resource department so that the department can modify the employee information.

Vendor instance 610 includes information regarding the vendor from whom the requested purchase is to be made. Associated access control list A 612 has the same specified access as the access control list A 612 associated with purchase order instance 602.

Figure 7:
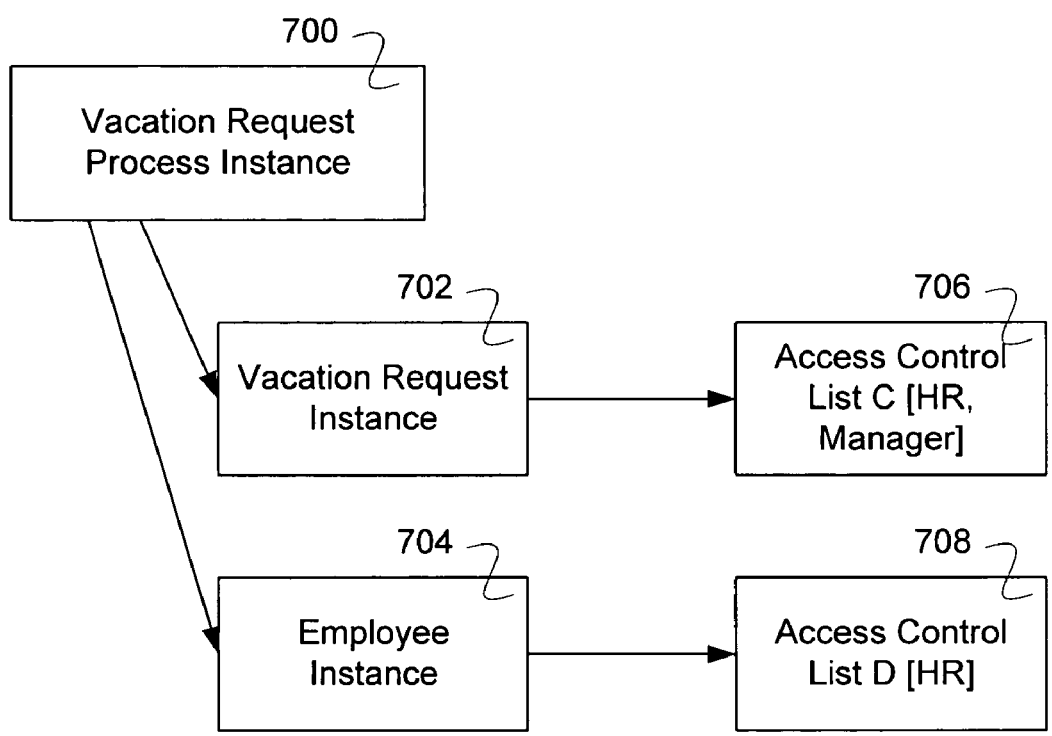
FIG. 7 is a block diagram illustrating an example of an embodiment of a business process instance and business process object instances.

FIG. 7 is a block diagram illustrating an example of an embodiment of a business process instance and business process object instances. In some embodiments, vacation request process instance 700 of FIG. 7 corresponds to a business process instance as created in 500 of FIG. 5, and vacation request instance 702 and access control list C 706 correspond to a business process object instance along with its corresponding access control list as referred to in 502 of FIG. 5. Similarly, employee instance 704 is an instance of a business process object with its corresponding access control list D 708. In the example shown, vacation request process instance 700 is a business process instance that instantiates a vacation request process. The instance of the process creates associated business process objects (702 and 704) and their associated access control lists (706 and 708). Access control lists for the business process objects are selected based on the access appropriate for the data held in the instance of the business process object. For example, information regarding the yearly vacation days accrued should be able to be edited by a human resource department; however, a requesting employee should not be able to change this field. Also, employee instance 704 can be the same type of business process object as employee instance 604. However, the two instances can have different associated access control lists, as in these examples employee instance 704 has access control list D 708 and employee instance 604 has access control list B 608.

Vacation request instance 702 includes information regarding a vacation request—for example, the requested dates, potential conflicts, etc. Associated access control list C 706 includes access information indicating read/write/edit access for the requesting employee and read access for the employee's manager and the human resources department.

Employee instance 704 includes information regarding an employee that requested the vacation—for example, employee name, employee identification number, vacation accrual level, etc. Associated access control list D 708 includes access information indicating read access for the employee so that the requestor can know their own vacation levels available and read/write/edit/delete access for the human resource department so that the department can modify the employee information.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for controlling access to business process data, comprising:
    specifying a first business process object to hold business process data of a first business process, associating the first business process object with a first access control list for controlling access of first business process object by the first business process, instantiating an instance of the first business process, including creating using a processor an instance of the first business process object configured to contain business process data that is to be manipulated by the instance of the first business process;
    associating with the first instance of the business process object an access control list that is determined based at least in part on the business process accessing the first business process object, including associating the first instance of the first business process object with the first access control list;
    specifying the first business process object to hold business process data of a second business process, associating the first business object with a second access control list for controlling access of the first business process object by the second business process, instantiating an instance of the second business process, including creating using a processor an instance of the first business process object configured to contain business process data that is to be manipulated by the instance of the second business process; and
    associating with the second instance of the first business object with an access control list that is determined based at least in part on the business process accessing the first business process object, including associating the second instance of the first business process object with the second access control list;
    wherein the first business process and the second business process is each defined by an unique set of steps for manipulating data stored in one or more business process objects;
    wherein the access control list indicates a type of access that an application and users will be allowed to have to the business process object.

2. A method as in claim 1, further comprising storing the business process object instances in a repository configured to allow access to the stored business process object instances according to the associated access control list.

3. A method as in claim 2, wherein the repository is associated with a content management system.

4. A method as in claim 1, wherein access includes a permission including one or more of the following: none, browse, read, relate, version, write, change location, change owner, change state, change permission, delete, execute, annotate, or approve.

5. A method as in claim 1, wherein access includes a restriction including one or more of the following: none, browse, read, relate, version, write, change location, change owner, change state, change permission, delete, execute, annotate, or approve.

6. A method as in claim 1, wherein access specifies a permission or a restriction for an application, a user, or a group of users.

7. A method as in claim 1, wherein access specifies that an accessing party be a specific application, a specific user, or a specific group of users.

8. A method as in claim 1, wherein access specifies that access is restricted if an accessing party is a specific application, a specific user, or a specific group of users.

9. A computer program product for controlling access to business process data, the computer program product being embodied in a non-transitory computer readable medium and comprising computer instructions for:
specifying a first business process object to hold business process data of a first business process, associating the first business process object with a first access control list for controlling access of first business process object by the first business process, instantiating an instance of the first business process, including creating using a processor an instance of the first business process object configured to contain business process data that is to be manipulated by the instance of the first business process;
associating with the first instance of the business process object an access control list that is determined based at least in part on the business process accessing the first business process object, including associating the first instance of the first business process object with the first access control list;
specifying the first business process object to hold business process data of a second business process, associating the first business object with a second access control list for controlling access of the first business process object by the second business process, instantiating an instance of the second business process, including creating using a processor an instance of the first business process object configured to contain business process data that is to be manipulated by the instance of the second business process; and
associating with the second instance of the first business object with an access control list that is determined based at least in part on the business process accessing the first business process object, including associating the second instance of the first business process object with the second access control list;
wherein the first business process and the second business process is each defined by an unique set of steps for manipulating data stored in one or more business process objects;
wherein the access control list indicates a type of access that an application and users will be allowed to have to the business process object.

10. A computer program product as in claim 9, further comprising computer instructions for storing the business process object instances in a repository configured to allow access to the stored business process object instance according to the associated access control list.

11. A computer program product as in claim 10, wherein the repository is associated with a content management system.

12. A system for controlling access to business process data, comprising:
a processor; and
a memory coupled with the processor, wherein the memory is configured to provide the processor with instructions which when executed cause the processor to:
specify a first business process object to hold business process data of a first business process, associating the first business process object with a first access control list for controlling access of first business process object by the first business process, instantiating an instance of the first business process, including creating using a processor an instance of the first business process object configured to contain business process data that is to be manipulated by the instance of the first business process;
associate with the first instance of the business process object an access control list that is determined based at least in part on the business process accessing the first business process object, including associating the first instance of the first business process object with the first access control list;
specify the first business process object to hold business process data of a second business process, associating the first business object with a second access control list for controlling access of the first business process object by the second business process, instantiating an instance of the second business process, including creating using a processor an instance of the first business process object configured to contain business process data that is to be manipulated by the instance of the second business process; and
associate with the second instance of the first business object with an access control list that is determined based at least in part on the business process accessing the first business process object, including associating the second instance of the first business process object with the second access control list;
wherein the first business process and the second business process is each defined by an unique set of steps for manipulating data stored in one or more business process objects;
wherein the access control list indicates a type of access that an application and users will be allowed to have to the business process object.

* * * * *